United States Patent

Park et al.

[11] Patent Number: 5,329,819
[45] Date of Patent: Jul. 19, 1994

[54] ULTRA-HIGH PRESSURE TRANSDUCER

[75] Inventors: Kyong M. Park, Thousand Oaks; Abrar A. Tirmizi, Simi Valley, both of Calif.

[73] Assignee: Kavlico Corporation, Moorpark, Calif.

[21] Appl. No.: 57,541

[22] Filed: May 6, 1993

[51] Int. Cl.$^5$ .............................. G01L 7/08; G01L 9/12
[52] U.S. Cl. .................................. 73/724; 73/706; 73/718; 361/283.1
[58] Field of Search .................. 73/718, 724, 706; 361/283.1, 283.2, 283.3, 283.4

[56]    References Cited
U.S. PATENT DOCUMENTS 5,115,676   5/1992   Lee ............................ 73/706

Primary Examiner—Donald Woodiel
Attorney, Agent, or Firm—Poms, Smith, Lande & Rose

[57]   ABSTRACT

A simple, reliable and inexpensive ultra high pressure transducer includes a basic capacitive transducer, made of two closely spaced insulating plates whose opposed faces contain conductive layers, and one of which plates is a thin and flexible diaphragm of low mechanical hysteresis. In mechanical coupling proximity with this insulating diaphragm is a thick metal diaphragm which is a part of the ultra high pressure coupling component. The flexure of this thick metal diaphragm under ultra high pressures, which are applied only on the side opposite the insulating diaphragm, determines the magnitude of the deflection of both diaphragms, and, corresponding to the resultant output capacitance level, provides a measure of the ultra high pressure level.

20 Claims, 2 Drawing Sheets

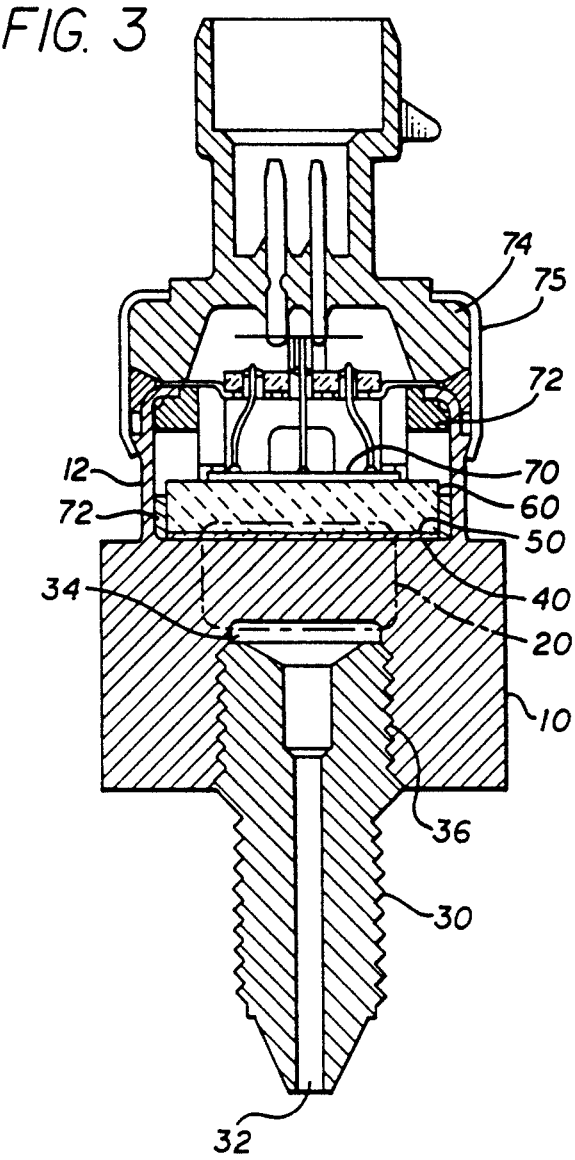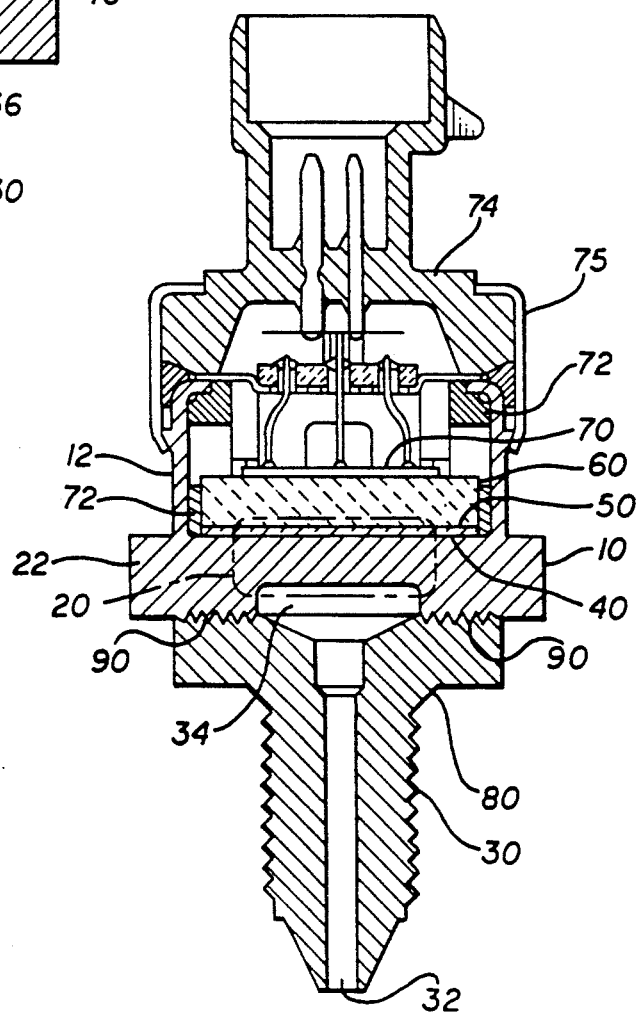

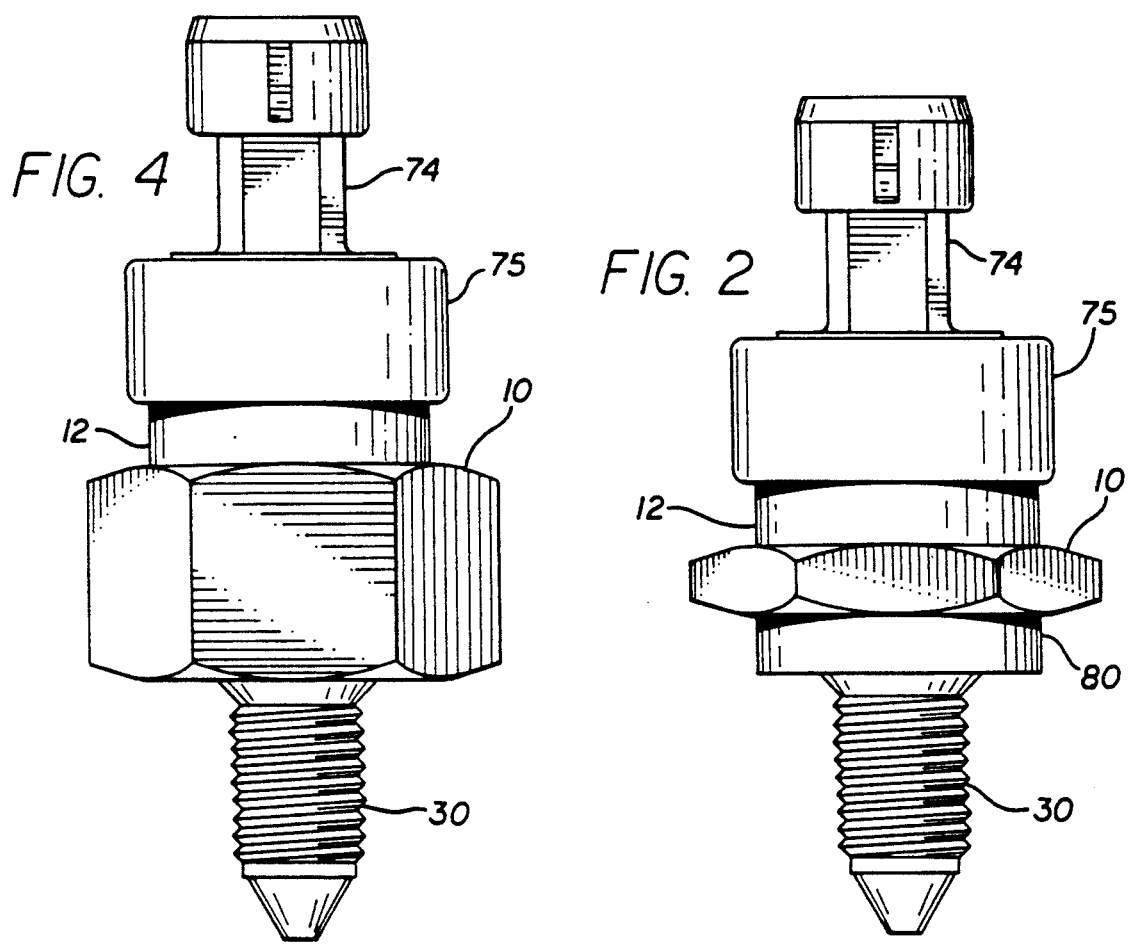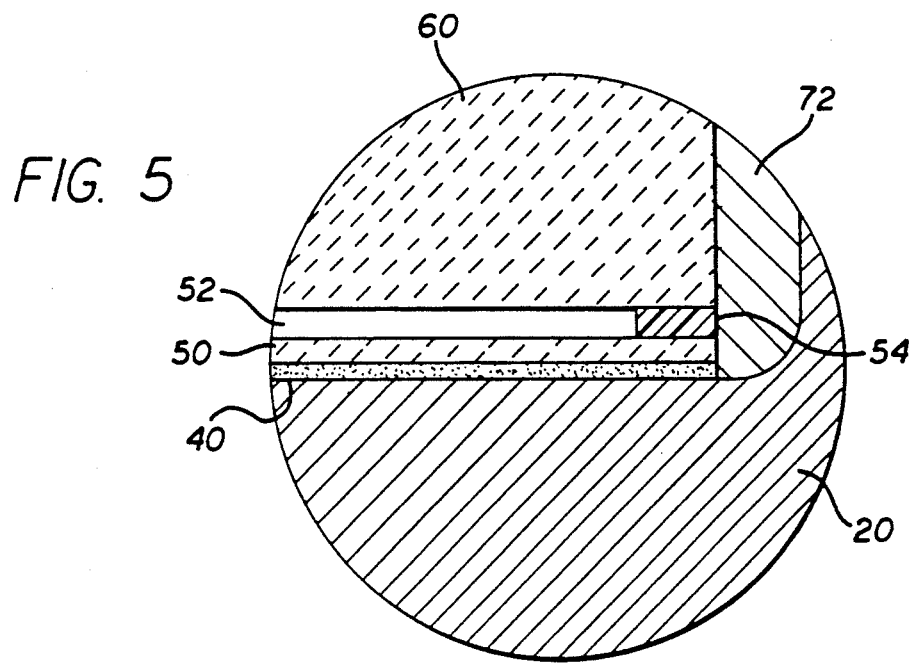

ULTRA-HIGH PRESSURE TRANSDUCER

FIELD OF THE INVENTION

This invention relates to ultra-high pressure transducers, for measuring pressures up to the order of 50,000 psi or more.

BACKGROUND OF THE INVENTION

Transducers for measuring ultra-high pressures, in the order of several hundred to several thousand atmospheres or more, are known, but they tend to be relatively massive and expensive.

For measuring lower pressures, in the order of 1,000 psi or less, reference is made to the capacitive pressure transducer assemblies and circuitry shown in U.S. Pat. No. 4,388,668 granted Jun. 14, 1983, U.S. Pat. No. 4,398,426, granted Aug. 16, 1983 and U.S. Pat. No. 4,227,419, granted Oct. 14, 1980, all of which are assigned to the assignee of the present invention. In the transducers shown in these patents, a thin diaphragm of low hysteresis insulating material, such as glass, or a ceramic such as alumina, is employed; and when pressure is applied to the diaphragm it flexes toward an adjacent base member, normally of the same material, and conductive layers forming electrodes on the facing surfaces change their spacing, thereby varying the capacitance between the two conductive-layer electrodes. Circuitry included in the transducer converts the capacitance changes to an electrical signal varying linearly with the pressure changes. These pressure transducers are relatively inexpensive and have been widely used in automotive control and other applications.

Transducers for pressure ranges up to about 1000 psi have been made using substantially the arrangements shown in the above cited patents. However, at pressures substantially above 1,000 psi, corresponding to more than 60 or 70 atmospheres or bars, standard low pressure transducer configurations are not entirely practical, as the pressure seals and other components cannot handle the very high pressures.

An effective high pressure transducer, also assigned to the assignee of the present invention, and operable up to about 10,000 psi is disclosed in U.S. Pat. No. 4,617,607, granted Oct. 14, 1986. In that transducer the pressure is primarily absorbed by a relatively thick insulating diaphragm which is hermetically sealed outside of the high pressure fluid by means of a thin metal diaphragm which is substantially coextensive with and in contact with the thick insulating diaphragm, and welded or otherwise bonded to the fitting which includes the high pressure chamber connected to the source of high pressure fluid.

However, at the ultra-high pressures handled by the present transducer, the compressive strength of the ceramic insulating diaphragm may be inadequate; therefore, the type of high-pressure transducer based on the principles disclosed in U.S. Pat. No. 4,617,607 may not be entirely suitable for ultra high pressures without significant improvement.

Accordingly, a principal object of the present invention is to provide an inexpensive ultra high pressure transducer.

SUMMARY OF THE INVENTION

In accordance with the present invention, a basic capacitive transducer is provided having an insulating diaphragm of low mechanical hysteresis, mounted closely spaced to an insulating base member and with conductive layers on both the opposed surfaces. A source of ultra-high pressure fluid to be measured is coupled to a high strength metal fitting by means of an ultra-high pressure input coupling part. The fitting includes a thick metal diaphragm, which is flexible under very high stresses, and which is substantially coextensive with and in immediately adjacent mechanically coupling proximity with the insulating diaphragm. As an integral portion of the fitting, between the input coupling part and the metal diaphragm, there is an ultra-high pressure chamber which is connected with the source of ultra-high pressure fluid by means of a channel which penetrates the input coupling part. As the ultra-high pressure varies, the pressure within the chamber causes a flexure of the thick metal diaphragm which in turn produces a flexure of the thin insulating diaphragm to operate the capacitive transducer.

The insulating plate and the insulating diaphragm are preferably of high compressive strength materials, and they are secured in a housing on top of the high strength fitting.

The pressure input coupling part can be either male or female type. The female type of pressure input coupling part can be machined as part of the fitting and requires no further processing. In some cases the male type pressure input coupling part is machined as a separate piece and joined together with the fitting to constitute an integral unit.

The metal diaphragm absorbs most of the pressure. The fitting, including the metal diaphragm, is heat treated after machining, or it may be made from already heat treated raw stock. The heat treatment is used to relieve stresses and make the material homogeneous. The thickness of the metal diaphragm can be between 0.020 inch to 0.500 inch thick. The diameter of the metal diaphragm can be anywhere from 0.250 inch to 2.00 inches. The metal diaphragm can be either machined as part of the fitting or as a separate piece. In the latter case, this separate diaphragm may be welded to the fitting using inertia, friction, stitch, EB, laser and other suitable methods of welding.

The ceramic sensor diaphragm sits on top of the thick metal diaphragm. These two diaphragms may be joined together using a high-temperature, high-strength, and low hysteresis epoxy. Care must be taken to exclude any trapped air or any other foreign substance in this epoxy bond. Also, the ceramic and the metal diaphragms must be cleaned prior to application of epoxy to ensure the integrity of the epoxy joint.

When pressure is applied to the transducer, the metal diaphragm deflects. This deflection is transmitted to the ceramic diaphragm through the epoxy. The resultant deflection of the ceramic diaphragm changes the capacitance of the ceramic sensors, resulting in a change of output.

The fitting can be made from any material with good elastic properties. However, carbon steel and stainless steel have proved most effective in the presently preferred embodiment. The ceramic sensor, including the base member and the diaphragm are then assembled with a hybrid output circuit mounted on the base member. This assembly may then be secured to a guiding spacer having a cylindrical outer configuration. Then a thin film of epoxy is applied to the ceramic diaphragm. This is then placed on the metal diaphragm and rotated several times to ensure even distribution of epoxy on both metal and ceramic diaphragms. Also the rotation helps to purge out any trapped air between the diaphragms. The upper part of the fitting is then crimped around the spacer to secure the ceramic diaphragm in place. The sensor assembly is then heated to cure the epoxy. After the epoxy is cured the assembly is thermocycled further, to relieve assembly stresses. After thermocycling the sensor is calibrated like a standard ceramic pressure sensor by trimming resistors on the hybrid circuit.

The high pressure fitting may be made in various ways. In accordance with one embodiment the heavy metal diaphragm and ultra high pressure chamber are formed in one part, and a high pressure fitting of reduced diameter and having a male threaded input coupling, is formed as a second part; and the two parts are joined entirely across their mating surfaces by friction welding. In accordance with another embodiment, the heavy metal diaphragm and ultra high pressure chamber are formed in one part with a female threaded cylindrical aperture enlarging the length of the chamber to the bottom of the fitting, while the substantially cylindrical high pressure input coupling part has a correspondingly male threaded upper portion which screws into the aperture and provides both the bottom of the chamber and the channel from the chamber to a source of ultra high pressure fluid; in this embodiment, the two parts in threaded engagement are brazed together on their threaded surfaces to form a single solid, pressure-resistant unit.

Other objects, features, and advantages will become apparent from a consideration of the following detailed description and from the accompanying drawings.

BRIEF DESCRIPTION OF THE DRAWINGS

FIG. 1 is a cross-sectional view of an ultra-high pressure transducer illustrating the principles of the present invention;

FIG. 2 is an exterior view of the transducer of FIG. 1;

FIG. 3 is a cross-sectional view of an alternative embodiment illustrating the principles of the present invention;

FIG. 4 is an exterior view of the transducer of FIG. 3; and

FIG. 5 is an enlarged cross-sectional view of a portion of FIG. 1.

DETAILED DESCRIPTION

Referring more particularly to the drawings, FIG. 1 shows an ultra high pressure transducer having an ultra high pressure fitting 10 which is also the base of a housing 12 containing hybrid electronics embedded in or attached to the hybrid circuit substrate 70. The substrate or printed circuit board 70 is attached to a ceramic plate 60 forming part of the pressure transducer which is a standard product made by the assignee of the present invention. Electrical leads to the circuit 70 are provided by connector pins (not numbered) which carry power to the circuit and carry signals from which the pressure may be determined; these pins pass through a connector housing 74 which is mounted above the housing 12.

As shown in FIG. 5 the ceramic plate 60 is spaced apart from another ceramic diaphragm 50 by means of glass frit 54 which bonds the peripheries of the facing plates 50 and 60. The central facing surfaces of both plates have conductive layers forming electrodes (not shown). Between the electrode portions of the plates 50 and 60 there is a very small variable capacitance cavity 52. The lower plate 50 is much thinner than plate 60 and is flexible under large deflection forces toward the plate 60, thereby altering the capacitance of the cavity 52. Because the lower ceramic plate 50 is flexible it will be referred to henceforth as a ceramic sensor diaphragm 50. The sensor diaphragm 50 is bonded by means of an epoxy bond 40 to an underlying thick metal diaphragm 20 which is flexible at the very high pressures to be measured. The diaphragm 20 may be a portion of a metal plate 22 which forms the base of the fitting 10 as in FIG. 1, or it may be a portion of the top surface of a heavy cylindrical fitting 10 as in FIG. 2. Below the metal diaphragm 20 there is an ultra high pressure input coupling part 30 which contains a channel 32 connecting the source of ultra high pressure fluid with an ultra high pressure chamber 34.

In the preferred embodiment shown in FIG. 1 the input coupling part 30 depends from a flat flange 80 which is welded to the plate 22 having the metal diaphragm 20 at its center, by means of a friction weld 90. The ultra high pressure chamber 34 is comprised of a central recess in the top of the flange 80 as shown in FIG. 1, together with a facing recess in the bottom of the metal plate 22.

The area of the top surface of the chamber 34 has an extent comparable to that of the bottom surface of the metal diaphragm 20, whose top surface in turn has an extent comparable to that of the active central area of the bottom of the ceramic sensor diaphragm 50.

Above the spacer 72 and attached to the housing 12 is a connector housing 74 through which pass electrical leads such as connector pins carrying power to the hybrid circuit and providing the signals from which the measurement of pressure may be obtained. The outer cylindrical sleeve 75 has its ends deformed inwardly to secure housing 74 to the upper portion 12 of the fitting 10.

In the alternative embodiment of FIG. 3, the metal diaphragm 20 is an integral portion of the fitting 10, whose lower portion contains a threaded cylindrical opening into which the correspondingly threaded ultra high pressure input coupling part 30 may be screwed. In this alternative embodiment the input coupling part 30 and the fitting 10 are combined into an ultra high pressure resistant unit by means of brazing the threaded surfaces 36 together using silver solder.

In both embodiments the net effect of the friction welding or the brazing is to combine the fitting 10 and the input coupling part 30 into a single solid unit.

In the preferred embodiment of this invention the bottom of the thin ceramic sensor diaphragm 50 is bonded to the top surface of the metal diaphragm 20; however as an alternative these two diaphragms could merely engage one another. In the bonded case, an epoxy that has been found effective is available as PERMABOND ESP 108 from Permabond International, 480-A S. Dean St., Englewood, N.J. 07631; in this case the curing is done for two hours at 150 degrees Centigrade. After curing, the entire assembly is thermal cycled further (to relieve assembly stresses), after which the sensor is calibrated conventionally.

The thickness of the metal diaphragm 20 may, for example, be between 0.020 inch to 0.500 inch, and its diameter may be about 0.25 inch to 2.00 inches. The metal diaphragm 20 can be either machined as part of the plate 22 or a separate piece. In the former case the plate 22 may be welded to the input coupling part using inertia, friction, stitch, EB, laser and other suitable methods of welding. In some applications the metal diaphragm 20 may be of a different material than the material of the fitting 10. However in all cases the metal diaphragm 20 should be combined with the fitting 10 and the input coupling part 30, either by welding or brazing or other high pressure resistant bonding suitable for attaching broad surfaced adjacent areas, to form an integral unit.

The fitting 10 is provided with an hexagonal configuration, as shown in FIGS. 2 and 4, for ease in securing against rotation, when the threaded ultra-high pressure input coupling part 30 is being threaded into position with the supply of ultra-high pressure fluid, or more generally, the hexagonal configuration may readily receive a wrench for other securing purposes.

The two plates 50 and 60 may for example be made of alumina, or other insulating material having low mechanical hysteresis such as glass or ceramic.

It may be noted that the metal diaphragm 20 completely seals the ultra-high pressure region including the channel 32 and the chamber 34, so that no ultra-high pressure fluid may penetrate within the assembly beyond the diaphragm 20.

The sensor diaphragm 50 is preferably spaced in the order of 0.0010 to 0.0015 inch away from the base plate 60, but lesser or greater separations such as from 0.0005 inch 0.0020 inch, are contemplated. On the facing surfaces of the diaphragm 50 and the plate 60 are conductive plates forming electrodes, as disclosed in the prior patents cited above. When ultra-high pressure fluid is applied through the input coupling part 30 via the channel 32, it enters the chamber 34 and applies ultra-high pressure across the diaphragm 20. It is this thick metal diaphragm whose thickness determines the magnitude of the deflection of the two adjacent diaphragms 50 and 20 as pressure in the chamber 34 is varied. Because the metal diaphragm 20 is in direct mechanically coupling proximity with the thin ceramic sensor diaphragm 50, the flexure of the metal diaphragm 20 causes the sensor diaphragm 50 to be flexed inwardly, which changes the capacitance between the two conductive plates or electrodes. Mounted on the top of the base plate 50 is a small printed circuit board 70 on which is mounted the electrical circuitry for converting changes in capacitance resulting from changes in spacing of the conductive plates into an output electrical signal, such as a varying voltage or a varying frequency, which may be employed to indicate the input pressure to the transducer.

The method of manufacture of the transducer per se, including the steps for applying the conductive surfaces to the ceramic plates to form electrodes, and the glass frit, and for firing the transducers may be as disclosed in the above-cited patents. An acceptable thickness of the ceramic sensor plate 60 is of the order of 0.050 to 0.200 inch, with a preferred value of 0.150 inch. An acceptable thickness of the ceramic sensor diaphragm 50 is of the order of 0.005 to 0.070 inch, with a preferred value of 0.030 inch.

In conclusion it is to be understood that the foregoing detailed description, and the accompanying drawings relate to two presently preferred illustrative embodiments of the invention. However, various changes may be made without departing from the spirit and the scope of the invention. Thus, by way of example and not of limitation, the transducer per se, and the metal fitting may be made of other materials than those mentioned herein above. In addition, the parts need not have the precise configuration described hereinabove, but may have alternative arrangements. Further, instead of the parts being made of metal, they may in many cases be formed of high strength composite materials. Accordingly, it is to be understood that the detailed description and the accompanying drawings as set forth hereinabove are not intended to limit the breadth of the present invention.

What is claimed is:

1. A simple and reliable ultra high pressure transducer comprising:

a capacitive pressure transducer made of two closely spaced insulating plates of low mechanical hysteresis material, said plates each having a layer of conductive material on their opposed faces forming electrodes which are spaced slightly apart from one-another, and at least one of said plates being a thin diaphragm which is flexible under applied deflection forces to deflect toward the other plate and change the capacitance between said electrodes, said thin diaphragm being mounted to and spaced apart from the other insulating plate at the facing surfaces of the outer peripheries thereof;

an ultra high pressure fitting including an ultra high pressure input coupling part for connecting to a source of ultra high pressure fluid, and a thick, flat flexible metal diaphragm integral with said fitting and in mechanical coupling proximity with said thin diaphragm over the greater portion of the active areas of said thin and thick diaphragms;

said thick metal diaphragm constituting means for determining the magnitude of the deflection of said thin and thick diaphragms as pressure to said ultra high pressure input coupling part is varied; and an ultra high pressure chamber adjacent to and having an extent comparable to that of said thick metal diaphragm, said chamber being connected to said input coupling part;

whereby, when the ultra high pressure applied to said input coupling part changes, the corresponding pressure change in said chamber causes the deflection of said thin and thick diaphragms to change correspondingly, and the resultant changed output capacitance of the transducer indicates the new ultra high pressure level.

2. An ultra high pressure transducer as defined in claim 1 wherein said insulating plates are made of alumina.

3. An ultra high pressure transducer as defined in claim 1 wherein said fitting and said thick metal diaphragm are made of steel.

4. An ultra high pressure transducer as defined in claim 1 wherein said thin insulating diaphragm is of the order of 0.005 to 0.070 inch thick.

5. An ultra high pressure transducer as defined in claim 1 wherein said thick metal diaphragm is in the order of 0.020 to 0.500 inch thick.

6. An ultra high pressure transducer as defined in claim 1 wherein said thin diaphragm and said thick metal diaphragm are bonded together by means of a high-temperature, high strength, low mechanical hysteresis epoxy applied to their cleaned mating surfaces with care to exclude trapped air or foreign substances.

7. An ultra high pressure transducer as defined in claim 1 wherein said two insulating plates and said thick metal diaphragm are circular in configuration.

8. An ultra high pressure transducer as defined in claim 1 wherein said insulating plates are formed of high compressive strength material.

9. An ultra high pressure transducer as defined in claim 1 wherein the diameter of said thick metal diaphragm is in the order of 0.25 inch to 2.00 inches.

10. A simple and reliable ultra high pressure transducer comprising:
- a capacitive pressure transducer made of two closely spaced insulating plates of low mechanical hysteresis material, said plates each having a layer of conductive material on their opposed faces forming electrodes which are spaced slightly from one-another, and at least one of said plates being a thin diaphragm which is flexible under applied deflection forces to deflect toward the other plate and change the capacitance between said electrodes, said thin diaphragm being mounted to and spaced apart from the other insulating plate at the facing surfaces of the outer peripheries thereof;
- an ultra high pressure fitting including an ultra high pressure input coupling part for handling pressures in excess of 20,000 psi and for connecting to a source of ultra high pressure fluid, and a thick, flat flexible metal diaphragm integral with said fitting and bonded to said thin diaphragm over the greater portion of the active areas of said thin and thick diaphragms;
- said thick metal diaphragm constituting means for determining the magnitude of the deflection of said bonded thin and thick diaphragms as pressure to said ultra high pressure input coupling part is varied; and
- an ultra high pressure chamber adjacent to and having an extent comparable to that of said thick metal diaphragm, said chamber being connected to said input coupling part;
- whereby, when the ultra high pressure applied to said input coupling part changes the corresponding pressure change in said chamber causes the deflection of said bonded thick and thin diaphragms to change correspondingly, and the resultant changed output capacitance of the transducer indicates the new ultra high pressure level.

11. An ultra high pressure transducer as defined in claim 10 wherein said insulating plates are made of alumina.

12. An ultra high pressure transducer as defined in claim 10 wherein said fitting and said thick metal diaphragm are made of steel.

13. An ultra high pressure transducer as defined in claim 10 wherein said thin insulating diaphragm is of the order of 0.005 to 0.070 inch thick.

14. An ultra high pressure transducer as defined in claim 10 wherein said thick metal diaphragm is in the order of 0.020 to 0.500 inch thick.

15. An ultra high pressure transducer as defined in claim 10 wherein said insulating diaphragm and said thick metal diaphragm are bonded together by means of a high-temperature, high strength, low mechanical hysteresis epoxy applied to their cleaned mating surfaces with care to exclude trapped air or foreign substances.

16. An ultra high pressure transducer as defined in claim 10 wherein said two insulating plates and said thick metal diaphragm are circular in configuration.

17. An ultra high pressure transducer as defined in claim 10 wherein said insulating plates are formed of high compressive strength material.

18. An ultra high pressure transducer as defined in claim 10 wherein the diameter of said thick metal diaphragm is in the order of 0.25 inch to 2.00 inches.

19. A simple and reliable ultra high pressure transducer comprising:
- a capacitive pressure transducer made of two closely spaced insulating plates of low mechanical hysteresis material, said plates each having a layer of conductive material on their opposed faces forming electrodes which are spaced slightly apart from one-another, and at least one of said plates being a thin diaphragm which is flexible under applied deflection forces to deflect toward the other plate and change the capacitance between said electrodes, said thin diaphragm being mounted to and spaced apart from the other insulating plate at the facing surfaces of the outer peripheries thereof;
- an ultra high pressure fitting including an ultra high pressure input coupling part for handling pressures in excess of 20,000 psi and for connecting to a source of ultra high pressure fluid, and a thick, flat flexible metal diaphragm joined integrally with said fitting and bonded to said thin diaphragm over the greater portion of the active areas of said thin and thick diaphragms;
- said thick metal diaphragm constituting means for determining the magnitude of the deflection of said bonded thin and thick diaphragms as pressure to said ultra high pressure input coupling part is varied; and
- an ultra high pressure chamber adjacent to and having an extent comparable to that of said thick metal diaphragm, said chamber being connected to said input coupling part;
- whereby, when the ultra high pressure applied to said input coupling part changes, the corresponding pressure change in said chamber causes the deflection of said bonded thin and thick diaphragms to change correspondingly, and the resultant changed output capacitance of the transducer indicates the new ultra high pressure level.

20. An ultra high pressure transducer as defined in claim 19 wherein said integral joining of said metal diaphragm and said fitting is achieved by means of a technique selected from the class consisting of:
- (a) friction welding of two flat, contiguous metal surfaces; and
- (b) extended threaded engagement combined with brazing of the threaded surfaces using silver solder.

* * * * *